US007197019B2

United States Patent
Menzel et al.

(10) Patent No.: US 7,197,019 B2
(45) Date of Patent: Mar. 27, 2007

(54) METHOD AND INSTALLATION FOR EXECUTING A HANDOVER IN MOBILE DATA TRANSMISSION SYSTEMS USING DATA DUPLICATION

(75) Inventors: Christian Menzel, Maisach (DE); Jean-Michel Traynard, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 950 days.

(21) Appl. No.: 10/344,106

(22) PCT Filed: Aug. 7, 2001

(86) PCT No.: PCT/DE01/03018

§ 371 (c)(1),
(2), (4) Date: Feb. 10, 2003

(87) PCT Pub. No.: WO02/13565

PCT Pub. Date: Feb. 14, 2002

(65) Prior Publication Data

US 2003/0176187 A1 Sep. 18, 2003

(30) Foreign Application Priority Data

Aug. 10, 2000 (DE) .............................. 100 39 193

(51) Int. Cl.
*H04Q 7/00* (2006.01)
(52) U.S. Cl. ...................................... 370/331; 455/436
(58) Field of Classification Search ................ 370/331, 370/310, 312, 315, 432; 455/436, 442, 439, 455/443, 524, 525; 375/220
See application file for complete search history.

(56) References Cited

U.S. PATENT DOCUMENTS

| 5,722,074 | A * | 2/1998 | Muszynski ................... 455/442 |
| 6,907,017 | B2 * | 6/2005 | Reddy et al. ................ 370/331 |
| 2002/0048266 | A1 * | 4/2002 | Choi et al. ................... 370/331 |
| 2002/0141360 | A1 * | 10/2002 | Baba et al. .................. 370/331 |
| 2002/0191558 | A1 * | 12/2002 | Agrawal et al. ............. 370/329 |

FOREIGN PATENT DOCUMENTS

| DE | 199 28 991 C1 | 9/2000 |
| DE | 199 28 999 A1 | 12/2000 |

(Continued)

OTHER PUBLICATIONS

James Kempf et al.: "IP Mobility and the CDMA Radio Access Network: Applicability Statement for Soft Handoff", Internet Draft "draft-kempf-cdma-appl-01.5xt", Jul. 2000.

(Continued)

*Primary Examiner*—Dang T. Ton
*Assistant Examiner*—Gary Mui
(74) *Attorney, Agent, or Firm*—Staas & Halsey LLP

(57) ABSTRACT

A method establishes a connection between a source network with a source network resource manager and a target network with a target network resource manager. According to the method, a connection control unit of the source network transmits a connection establishment signal to a connection control unit of the target network and—parallel to this—a reservation request to the target network resource manager. The target network resource reserves the requested resources and forwards the reservation request towards the target network resource manager, which also reserves the requested resources and transmits reservation information regarding the success of the resource reservations to the connection control unit of the target network.

16 Claims, 4 Drawing Sheets

FOREIGN PATENT DOCUMENTS

| | | |
|---|---|---|
| WO | WO 96/02117 | 1/1996 |
| WO | WO 98/38808 | 9/1998 |
| WO | WO 00/05909 | 2/2000 |
| WO | WO 01/78436 A1 | 10/2001 |

OTHER PUBLICATIONS

3G TS 23.060, v3.3.0 (200-04), Technical Specification, 3rd Generation Partnership Project, Technical Specification Group Services and System Aspects, General Packet Radio Service (GPRS), Service Description, Stage 2, (Release 1999).

Seshan et al., "Handoffs in Cellular Wireless Networks: The Daedalus Implementation and Experience", Wireless Personal Communications 4, 1997, pp. 141-162.

Seneviratne et all, "Cellular Networks and Mobile Internet", Computer Communications 21 (1998), pp. 1244-1255.

Valko et al., "Cellular IP: A New Approach to Internet Host Mobility", Computer Communication Review, Jan. 1999, pp. 50-65.

Eneroth et al., "Applying ATM/AAL2 as a Switching Technology in Third-Generation Mobile Access Networks", IEEE Communications Magazine, Jun. 1999, pp. 112-122.

O'Neill et al., "Edge Mobility Architecture", Internet Draft, Jul. 2000, pp. 1-29.

* cited by examiner

METHOD AND INSTALLATION FOR EXECUTING A HANDOVER IN MOBILE DATA TRANSMISSION SYSTEMS USING DATA DUPLICATION

CROSS REFERENCE TO RELATED APPLICATIONS

This application is based on and hereby claims priority to PCT Application No. PCT/DE01/03018 filed on 7 Aug. 2001 and German Application No. 100 39 193.1 filed 10 Aug. 2000, the contents of which are hereby incorporated by reference.

BACKGROUND OF THE INVENTION

The present invention relates to carrying out a handover in a mobile data transmission system, with data being passed on at least partially on the basis of the Internet Protocol (IP) in the mobile data transmission system. At least some of the devices in the data transmission system are thus connected to one another by an IP network. Packet-data-based data transmission therefore takes place at least in a subarea of the data transmission system. A connection such as this by an IP network is in principle known from the related art. As an example of this, reference should be made to WO 98/38808.

However, other possible ways for connecting the devices in a mobile data transmission system are known, such as those which are used in the mobile radio systems that exist at the moment. In this case, the devices are connected to one another by means, for example, of ATM networks or PCM30 lines.

However, the present invention is not just restricted to mobile radio systems such as these. For example, it can in principle be used for different types of mobile data transmission systems which may be designed to transmit any desired data such as multimedia data, speech data, data from computer networks or the like.

The systems and methods which are well known from the related art for carrying out a handover have the disadvantage that a high level of complexity is required in order to pass on the data within the mobile data transmission system. In particular, it is possible in previous systems and methods for a situation to arise during a handover from a first transmitting/receiving device to a second transmitting/receiving device in which, although a mobile terminal is supplied from the second transmitting/receiving device during and after a successful handover, the data stream from the data transmission system to the terminal still has to be passed via the first transmitting/receiving device however, in order to ensure a continuous data stream. In cases such as this, considerable complexity is involved in changing the route for passing on data within the data transmission system. In addition, in a packet-data-based network, the process of setting up the connection from the second transmitting/receiving device to the mobile terminal can actually take a relative long time lasting up to several seconds, which is not acceptable for providing real-time communications connections such as speech or multimedia connections in data transmission systems such as these.

A. O'Neill et al., "Edge Mobility Architecture", Internet Draft, July 2000, XP002169893, describes handover scenarios for an edge mobility architecture (EMA). In this case, a connection is set up between an old access router (OAR) and a new access router (NAR) during a handover. Data can be transmitted from the old access router to the new access router via this connection. Two variants of the procedure for a handover are described. On the one hand, the connection to the old access router can be interrupted before the connection to the new access router exists, or on the other hand the connection to the old access router is interrupted only after the connection to the new access router has been terminated.

G Eneroth et al., "Applying ATM/AAL2 as a switching technology in third-generation mobile access networks", IEEE communications magazine, IEEE service center Piscataway, N.J., US, Volume 37, No. 6, June 1999, pages 112–122, XP000835287 ISSN: 0163-6804, describes a soft handover in a third-generation mobile communications system which uses ATM (asynchronous transfer mode).

A. G. Valko, "Cellular IP: A new approach to Internet host mobility", Computer Communications Review, Association for Computer Machinery, New York, US, Volume 29, No. 1, January 1999, pages 50–65, XP000823873 ISSN: 0146-4833, describes an IP-based mobile communications system, in which the data in the downlink direction is transmitted to the old base station and to the new base station during a handoff which is initiated by a mobile terminal.

SUMMARY OF THE INVENTION

One potential object for the present invention is to provide a method and a system for carrying out a handover for a mobile terminal in a mobile data transmission system, which allows the matching and optimization of the process of passing on the data in the data transmission system to be carried out in a simplified way.

In the method for carrying out a handover for a mobile terminal in a mobile data transmission system from a first transmitting/receiving device in the mobile data transmission system to a second transmitting/receiving device, provision is made, as already described, for data to be passed on at least partially on the basis of the Internet Protocol (IP) in the mobile data transmission system. Now, at least for a portion of the duration of the handover, the data (downlink direction) which is transmitted from the mobile data transmission system to the terminal (IP) in the mobile data transmission system. Now, at least for a portion of the duration of the handover, the data (downlink direction) which is transmitted from the mobile data transmission system to the terminal is duplicated in the mobile data transmission system, and is passed not only to the first transmitting/receiving device but also to the second transmitting/receiving device. It is thus actually possible at an early stage for the second transmitting/receiving device to have the same knowledge about the data to be transmitted as the first transmitting/receiving device so that, in particular, it is possible to avoid passing on the data from the first to the second transmitting/receiving device. The necessary duplication of data can actually be carried out in an IP-based network in a simple manner by duplication of IP data packets. The fact that the data is present in an identical form also simplifies subsequent optimization of the process for passing on data after the successful handover, namely exclusively via the second transmitting/receiving device, since both transmitting/receiving devices then have identical knowledge of the data. Finally, the process of setting up the communications connection from the second transmitting/receiving device to the mobile terminal can be speeded up since the duplication of the data means that all the data which is required for continuing the communications connection between the data transmission system and the terminal without any interruption is already available in the transmitting/receiving device considerably before the communications connection is set up.

Data may be duplicated in various ways. However, in order to exploit the advantages of an IP-based network, it is preferable to provide for the addressing of the data in the mobile data transmission system to be changed.

Suitable addresses can now be chosen which allow duplication. For this purpose, an address of a device in the mobile data transmission system may be chosen as the address to be changed. The data is then either passed on to a device with a specific IP address, which carries out the process of duplicating the data and then addresses this data to the addresses of the first and second transmitting/receiving devices. The duplication process is thus essentially carried out by changing the addresses of the data, that is to say by so-called rerouting. The start and end of such a duplication process can also be controlled via the addressing of the data, since this addressing in the first step results in the data to be duplicated being passed to the duplicating device in the data transmission system. Thus, only internal parameters in the data transmission system, but no terminal-specific information whatsoever, or information relating to the subscriber who is using that terminal, is required in the course of the overall duplication of the data, thus once again considerably simplifying the process of carrying out the handover.

Alternatively, however, an address which identifies the data stream from the mobile data transmission system to the terminal may also be chosen as the address to be changed. In a situation such as this, the duplication is then not carried out at the Internet Protocol level but at a different level in which the datastream to a specific terminal or parts (packets) in the datastream are addressed. The addresses of the datastream or of the data packet can then be analyzed by the duplicating device, for duplication, with the data in the datastream being duplicated depending on the addresses. Individual matching of the duplicating device to the individual datastreams, for example by appropriate signaling, should generally be provided for this purpose.

In order to achieve even further optimization of the handover process, data which is stored in a data memoryin the first transmitting/receiving device in the course of duplication of the data, and data which is received from the terminal, can be transmitted to the second transmitting/receiving device, and is stored in a corresponding data memory there. The identical states in the first and second transmitting/receiving devices are thus brought about not only by the duplication of the data but also by the adjustment of the stored data, thus speeding up the process.

In order to ensure that data is passed on optimally and efficiently in the transmission direction from the terminal to the data transmission system (uplink) as well, it is possible, where necessary, to provide that during the duplication of the data which is transmitted from the data transmission system to the terminal, the data which is transmitted from the terminal and is received by the first transmitting/receiving device and by the second transmitting/receiving device is combined—and with identical data not being passed on twice providing that this has not already been predetermined automatically by the data transmission system. Thus, if required, it is possible to provide for the data which is received by the data transmission system from the transmitting/receiving devices to be combined in a selected manner to form a single datastream, with data which is being received twice (received once by the first transmitting/receiving device and once by the second transmitting/receiving device) being sorted out, while in contrast data which is not received by one of the transmitting/receiving devices is filled in by that received by the other transmitting/receiving device, thus producing an unambiguous, continuous datastream.

The abovementioned processes are generally continued until the handover has been successfully completed. Once the handover has been carried out successfully, the duplication of the data can be ended, and the datastream and data route can be optimized within the data transmission system such that, for example, the data from and to the terminal is now passed only viathe second transmitting/receiving device, and the first transmitting/receiving device need no longer be included in this data routing.

In order to control the duplication in as simple a manner as possible, the duplication of the data can be initiated by the first transmitting/receiving device since it has all the necessary information on the necessity and the current status of a handover for a terminal which is being supplied by it.

A mobile data transmission system having a plurality of transmitting/receiving devices for transmitting data to mobile terminals is proposed as an arrangement, with the data transmission system having devices for passing data on in accordance with the Internet Protocol. Provision is now made for the data transmission system to have devices for duplication of data, which are connected to at least two transmitting/receiving devices. For duplication, these devices can now provide the data to be transmitted to the terminal in a simple manner for the first and second transmitting/receiving devices, thus considerably simplifying the way in which data is passed on in the course of the handover.

As already stated, the data transmission system may in principle be designed to transmit widely differing types of data. Specifically, however, the data transmission system may be a mobile radio system. By way of example, the mobile radio system may have devices for radio transmission in accordance with a second-generation mobile radio system standard, such as GSM, and landline network devices in accordance with a third-generation mobile radio system standard, such as UMTS or UTRAN. Specifically, the data transmission system may be a GERAN system which forms a radio access network for the second generation of mobile radios, and which has interfaces to a switching network (core network) for the third generation of mobile radio networks. However, other types of mobile radio networksare also feasible within the scope of this invention.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
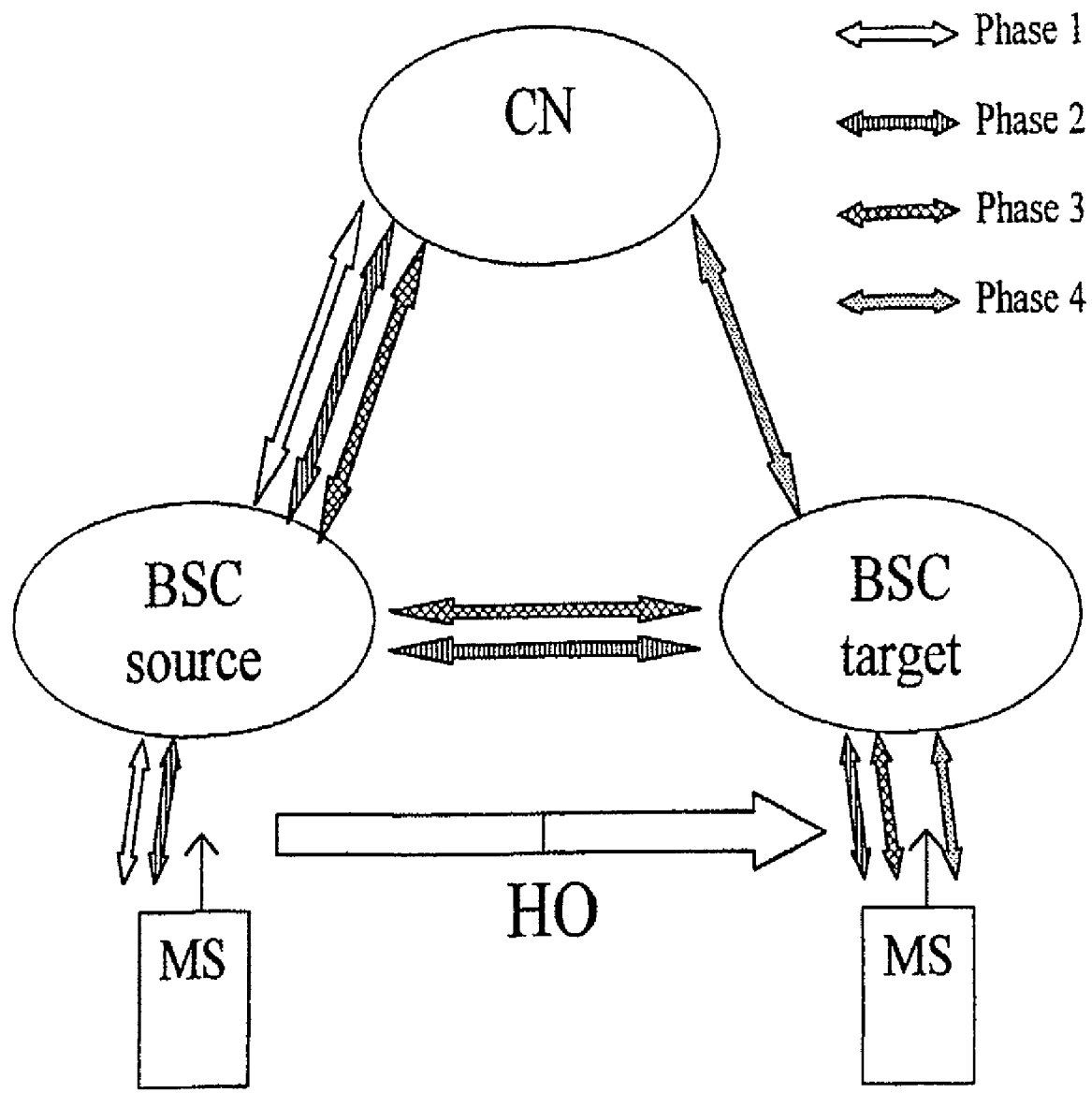
FIG. 1 shows a subscriber data stream during the handover.

Reference will now be made in detail to the preferred embodiments of the present invention, examples of which are illustrated in the accompanying drawings, wherein like reference numerals refer to like elements throughout.

The method and installation will be explained on the basis of a handover process and with reference to a GERAN system, with the individual components of the GERAN system being connected by an IP network. The method and installation are in fact suitable for such passing on of packet-based data on the basis of the Internet Protocol, since data packets can be duplicated there in a simple manner, as is proposed for method and installation.

In the following text, the expression transmitting/receiving device means the system of a base station controller BSC. For simplicity reasons, no further description will be provided in the following text of the fact that such a base station controller BSC still requires specific devices, which are referred to as base stations BS and which carry out the actual antenna functions, for transmitting and receiving data. Where the expression base station controller BSC is used in the following text, this presupposes the presence of corresponding base stations which are connected to that base station controller, so that these are also included in the descriptions of a base station controller BSC without needing to be exclusively mentioned.

FIG. 1 in this case shows the sequences during the handover process HO, which relate to the subscriber data, that is to say to the data which is transmitted from and to the subscriber. The handover process in this case has at least three phases, and a fourth phase may optionally be added. The illustrated sequences shown in FIG. 1 assume that a duplicator for duplicating IP packets resides in a source base station controller BSC Source and not, as is in principle likewise possible, in the core network CN or in a serving GPRS support node SGSN. This source base station controller BSC Source in the situation shown in FIG. 1 is connected to transmitting/receiving devices (BS) in a cell of the mobile radio system in which a specific subscriber terminal MS is currently located. In principle, a base station controller such as this may be connected to a plurality of transmitting/receiving devices in a plurality of cells.

Phase 1 relates to the situation before the handover HO. The base station controller BSC Source which is responsible at that time for supplying a mobile subscriber terminal MS—that is to say for controlling and maintaining the communication link to a subscriber terminal—identifies the need for a handover for this subscriber terminal MS. The data within the communications connection is still being passed directly between the core network CN and the subscriber terminal MS via the base station controller BSC Source, as is indicated by the corresponding double arrows. However, at this point, the supplying base station controller BSC starts to exchange signaling data with that base station controller BSC Target which is intended to provide the supply for that subscriber terminal in the future, for example relating to the provision of transmission capacities (resource allocation) as likewise indicated by double arrows.

In phase 2, the subscriber data is duplicated in the downlink direction from the core network CN to the subscriber terminal MS in the supplying base station control BSC Source, and is passed firstly to the currently supplying cell in the mobile radio system and secondly also to the base station controller BSC Target, which is intended to supply the subscriber terminal MS once a handover HO has taken place. In the uplink direction from the subscriber terminal MS to the core network CN, the data which is transmitted by the subscriber terminal may possibly be received by both base station controllers. In this case, a selection must be made from the data received by the two base station controllers BSC Source and BSC Target in order on the one hand to ensure that the data is not transmitted twice but that, nevertheless, all the data is passed to the core network CN. During phase 2, the subscriber terminal MS also completes the actual change from the previous base station controller BSC Source to the new base station controller BSC Target, with this process being controlled by the mobile radio system and by the base station controller BSC Source. The base station controller BSC Target which now has the responsibility detects the subscriber terminal MS and takes over the task of maintaining the communications connection to that subscriber terminal.

During phase 3, the transmission capacities of the previous base station controller BSC Source and of the previously supplying cell are released again, thus clearing the communications connection to the subscriber terminal. However, the subscriber data is still passed on within the mobile radio network from the base station controller BSC Target which is now providing the supply, via the previously supplying base station controller BSC Source, to the core network CN, and vice versa. This is once again indicated in the figure by double arrows. Provided that there is no further requirement or no further possible way to optimize the data flow in the mobile radio network, phase 3 may be the final phase of the handover, for example if only one intra-BSC handover has taken place and BSC Source and BSC Target are thus identical, or there is no direct data connection between the base station controller BSC Target and the core network CN or if, contrary to the previous assumptions, provision has been made for the duplication of the subscriber data to be carried out directly in the core network CN rather than in a base station controller BSC Source.

However, if it is necessary or else possible to optimize the data flow, phase 4 is carried out, in which the data stream is no longer passed via the previous base station controller BSC Source, with the subscriber data now instead of this being interchanged directly between the core network CN and base station controller BSC Target which now supplies the subscriber terminal MS.

Figure 2:
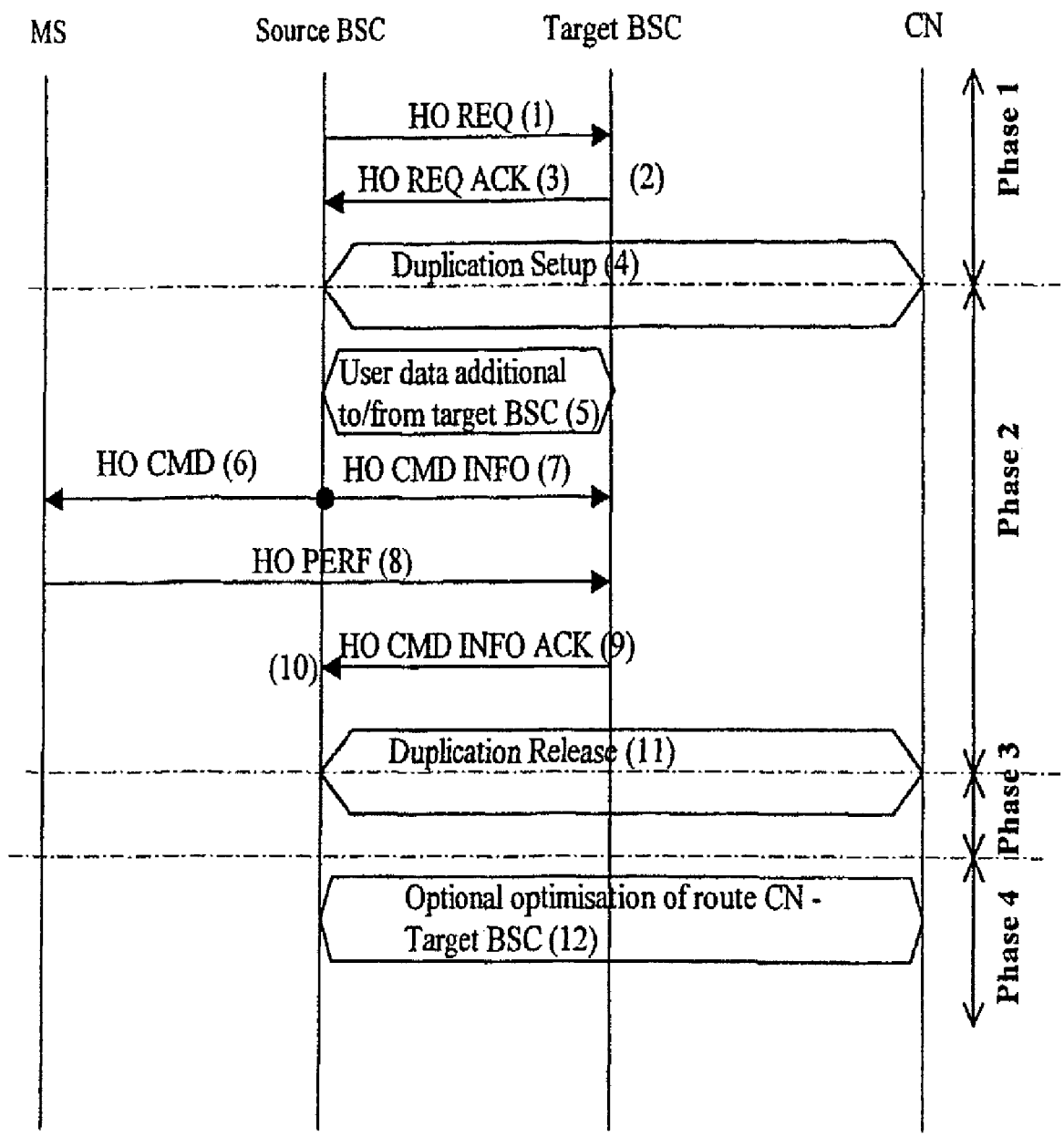
FIG. 2 shows a signaling scheme relating to the sequences shown in FIG. 1.

FIG. 2 shows the sequence for signaling during the handover HO as illustrated in FIG. 1. In particular, FIG. 2 also shows which of the signaling commands are interchanged in which of the phases 1 to 4. The individual signaling steps are numbered successively from 1 to 12 in brackets, and these individual steps will be explained in the following text.

(1) The base station controller BSC Source which is currently supplying the subscriber terminal MS identifies the need for a handover and sends a request for a handover (HO request message) HO REQ to the base station controller BSC Target which is intended to supply the subscriber terminal MS in the future. This message HO REQ may either be passed directly from the base station controller BSC Source to the base station controller BSC Target, or may be passed via the core network CN to the base station controller BSC Target, without the core network CN carrying out any further processing on this message. The message HO REQ contains all the information about all the radio resources (channels) which have been requested by the base station controller BSC Target for the subscriber terminal to be supplied. The information in the HO REQ message allows the base station controller BSC Target to produce a map of the configuration of the radio link control (RLC) buffer (control data for the communications connection).

(2) As soon as the base station controller BSC Target receives the message HO REQ, it checks the available transmission capacities. Provided that sufficient transmission capacities are available, these are reserved for the connection that is to be set up to the subscriber terminal MS.

(3) The base station controller BSC Target responds to the message HO REQ from the base station controller BSC Source with the acknowledgement message HO Request Acknowledge HO REQ ACK. This message contains a complete description of the transmission capacities (which will be described in step (5)) which have been reserved by the base station controller BSC Target, as well as additional information which is required for duplication or selection of subscriber data in the next step (4).

(4) The base station controller BSC Source receives the message HO REQ ACK and initiates the duplication of the subscriber data in the downlink direction, for example the duplication of U-GTP packets, at the IP level. The IP data stream, which is characterized by an appropriate IP address and contains the data packets of a U-GTP data stream, is in the process readdressed in some suitable manner. In particular, provision is made to use the changed IP address to address a duplicator, which then carries out the rest of the duplication process. This IP address change (rerouting) is preferably carried out in a serving GPRS support node SGSN. The further details of the duplication process will be explained in the following text. In the uplink direction, in order to ensure selection of the subscriber data, it is possible to dispense with further operations, provided that devices in the mobile radio network such as the serving GPRS support node SGSN in any case analyze the addressing data (headers) of the data which is sent by the subscriber terminal MS, allowing data selection to be carried out directly. However, if no such provision is made, appropriate selection of the subscriber data must be initiated in the uplink direction.

(5) The process of duplicating the subscriber data in the downlink direction and the selection of the subscriber data in the uplink direction is now started at the IP packet level and is continued until the duplication function is canceled once again.

(6) As soon as the duplication and selection processes have been set up completed, the actual handover HO of the subscriber terminal MS can be carried out. To do this, the base station controller BSC Source transmits the handover command HO CMD to the subscriber terminal, and at the same time transmits to the base station controller BSC Target the message HO CMD INFO that the command HO CMD has been sent. The handover command HO CMD informs the subscriber terminal MS of the transmission channels to which it must change for the cell which will supply it in the future, in order to continue to maintain the communications connection.

(7) The message HO CMD INFO informs the base station controller BSC Target for the downlink direction of the data packets (radio link control RLC packets) which have already been sent and, if a reception confirmation is provided, of which data packets have already been confirmed. For the uplink direction, this message contains those data packets (RLC packets) which have admittedly already been received by the base station controller BSC Source but have not yet been passed on at the PDCP packet data level, that is to say those parts of that PDCP data packet which are currently being sent by the subscriber terminal. The HO CMD INFO message contains this information for all the radio link control RLC transmission capacities which have been allocated to a specific subscriber terminal. This operation is carried out as described in detail once again in the following text with reference to FIG. 3.

(8) The successful setting up of the new radio link between the subscriber terminal MS and the base station controller BSC Target is reported to the base station controller BSC Target by the subscriber terminal MS by a message to the effect that the handover has been carried out (HO performed) HO PERF.

(9) As soon as the subscriber terminal has successfully set up the radio link to the new cell which will now supply it, the base station controller BSC Target can confirm reception of the message HO CMD INFO by transmitting the message HO Command Information Acknowledge HO CMD INFO ACK to the base station controller BSC Source.

(10) The message HO CMD INFO ACK causes the base station controller BSC Source to once again release the transmission channels which until this point were reserved for the radio link to the subscriber terminal, and also to once again release the corresponding radio link control RLC transmission capacities.

(11) There is now no longer any need to duplicate the subscriber data in the downlink direction. This results in either the base station control BSC Target or, as is illustrated in FIG. 2, the base station controller BSC Source to stop the duplication (duplication release) of the subscriber data. In consequence, the IP address of the base station controller BSC Target for the subscriber data stream (U-GTP data stream) in the downlink direction is selected, preferably by a serving GPRS support node SGSN, instead of addressing a duplicator, as provided by way of example in (4). (12) This may now be followed by the optional phase 4, during which the data flow between the core network CN and the base station controller BSC Target can be optimized.

Figure 3:
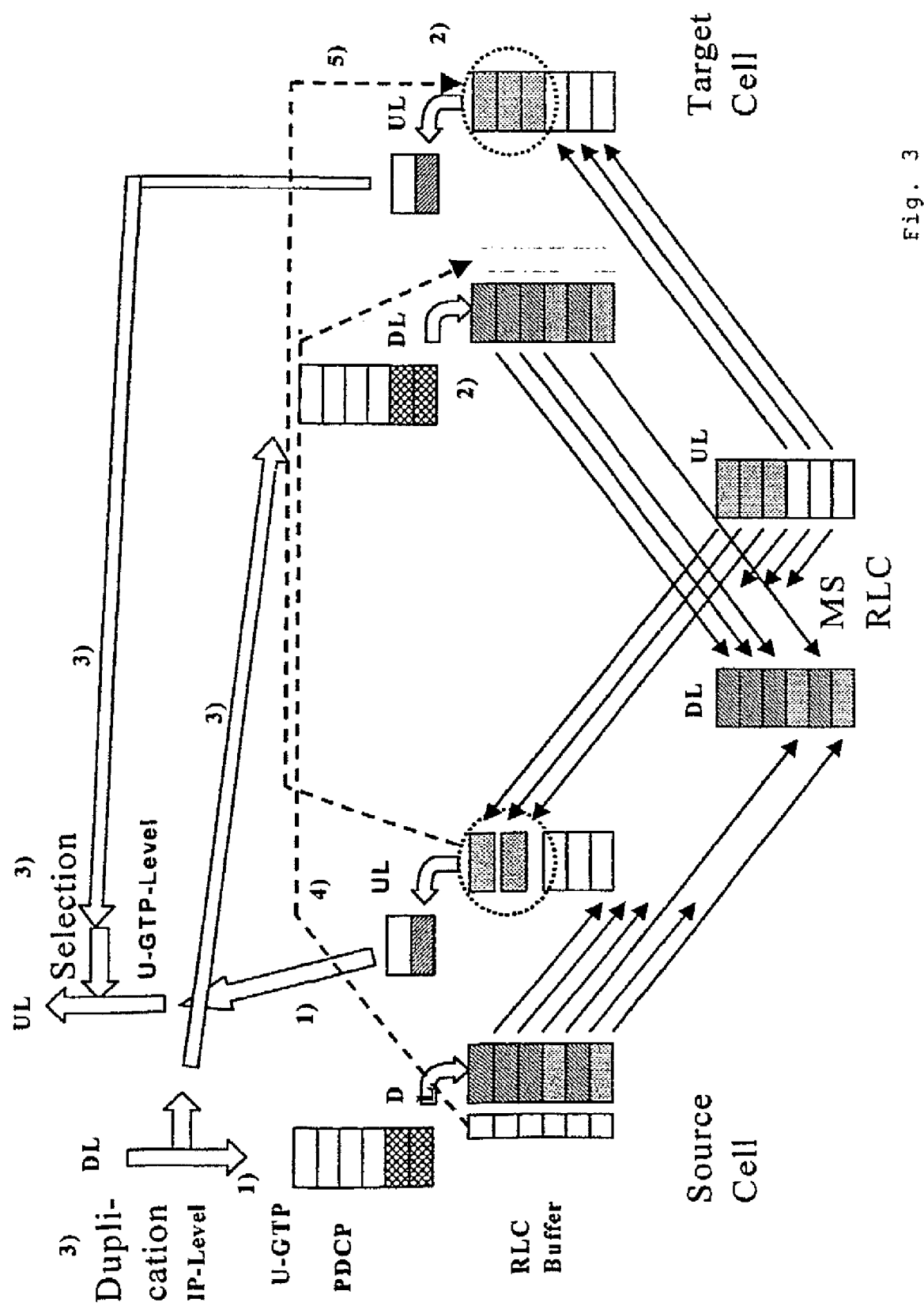
FIG. 3 shows a detailed illustration relating to the sequences shown in FIG. 1.

FIG. 3 shows a more detailed overview of the operations described above. This illustrates the processing of the subscriber data in the uplink direction and in the downlink direction in a more comprehensive manner. FIG. 3 illustrates this on the basis of only one connection channel (that is to say of only one RLC transmission unit) per transmission direction but, in principle, a plurality of connection channels may also, of course, be provided for each transmission direction. The numbers 1) and 2) etc. refer to the different phases or steps in the method procedure, and will be described in detail in the following text.

The procedures annotated 1) represent the stream of subscriber data (in this case IP packets which contain U-GTP packets) in the direction of the subscriber terminal MS and originating from the subscriber terminal MS, without there being any duplication or selection of the subscriber data. This therefore corresponds to phase 1, as mentioned above.

2) denotes the RLC and PDCP transmission units which must be produced in the target cell or in that base station controller BSC Target which will supply the subscriber terminal MS after the handover when the base station controller BSC Target responds with the message HO REQ ACK. These RLC and PDCP transmission units must be identical to the corresponding units in the source cell or in the base station controller BSC Source which were originally supplying the subscriber terminal MS before the handover.

3) denotes the process of carrying out the duplication or selection of the subscriber data, which the base station controller BSC Source initiates after receiving the message HO REQ ACK.

The duplication allows all the subscriber data, in this case IP packets, which has been sent in the downlink direction to be sent not only to the base station controller BSC Source but also to the base station controller BSC Target. This duplication is based in particular on the numbering of the U-GTP data packets. This numbering is necessary for the further processing of the data packets in the base station controllers BSC Source and BSC Target (in this context, see the numbers 4) and 5)), in order that the base station controllers BSC Source and BSC Target contain the same information on which PDCP data packet is currently being processed, and in particular is being segmented, in the RLC data buffer (RLC buffer).

The selection of the subscriber data simply means that subscriber data packets, in this case U-GTP data packets, can be received both by the base station controller BSC Source and by the base station controller BSC Target, and can be passed on in the uplink direction. In principle, data packets may in this case be received twice, and half of the packets which are being received twice must then be sorted out. However, if duplicated reception is precluded, as is assumed in GERAN systems, then there is no need for any such sorting out process. All that is then necessary is to ensure that those parts of the subscriber data which are received by both the base station controllers BSC Source and BSC Target are joined together in the correct sequence.

Numbers 4) and 5) show the procedures which take place once the duplication and selection process as indicated by number 3) have been set up successfully. The base station BSC Source can then cause the subscriber terminal MS to change from the source cell to the target cell, and this is done by transmitting the command HO CMD. At the same time that the command HO CMD is transmitted, the notification HO CMD INFO is transmitted to the base station controller BSC Target. This message HO CMD INFO is indicated by the dashed arrows numbered 4) and 5).

In this case, the arrow numbered 4) means in particular that the base station controller BSC Source sends the base station controller BSC Target a bit pattern which represents the status "sent" or "acknowledged" for the RLC data buffer (RLC buffer) for that PDCP data packet which is currently being sent. The arrow numbered 4) also represents information on which PDCP data packet is currently being sent. However, since it is possible after this to combine a plurality of U-GTP data streams in one PDCP data stream by multiplexing, it may be worthwhile transmitting the number of U-GTP data packets or data packets which is or are currently being sent to the base station controller BSC Target, in addition to or instead of the number of the PDCP data packet which is currently being sent.

The dashed arrow numbered 5) means that RLC data packets which have already been received by the base station controller BSC Source from a PDCP data packet which has not yet been received completely are transmitted to the RLC data buffer (RLC buffer) for the uplink direction for the base station controller BSC Target in order that the PDCP data packet can be completely filled there with the RLC data packets that are still missing. This avoids the necessity for the subscriber terminal MS to repeat the transmission of the data packets which have been received by the base station controller BSC Source.

The information received on the basis of numbers 4) and 5) allows the base station controller BSC Target to take over the task of sending those RLC data packets which have not yet been sent or acknowledged in the downward direction, since the base station controller now has a map of the RLC data buffer of the base station controller BSC Target. On the other hand, the base station controller BSC Target can now acknowledge, in the case of data transmission, with an acknowledgement in the uplink direction those RLC data packets which have already been received by the base station controller BSC Target in the uplink direction. As soon as a PDCP data packet which has not yet been received completely by the base station controller BSC Source can be completed by the base station controller BSC Target receiving the missing RLC data packets, the PDCP data packet can be sent as a U-GTP data packet to the core network Cn, with the aid of the selection function which has been set up at number 3).

Figure 4:
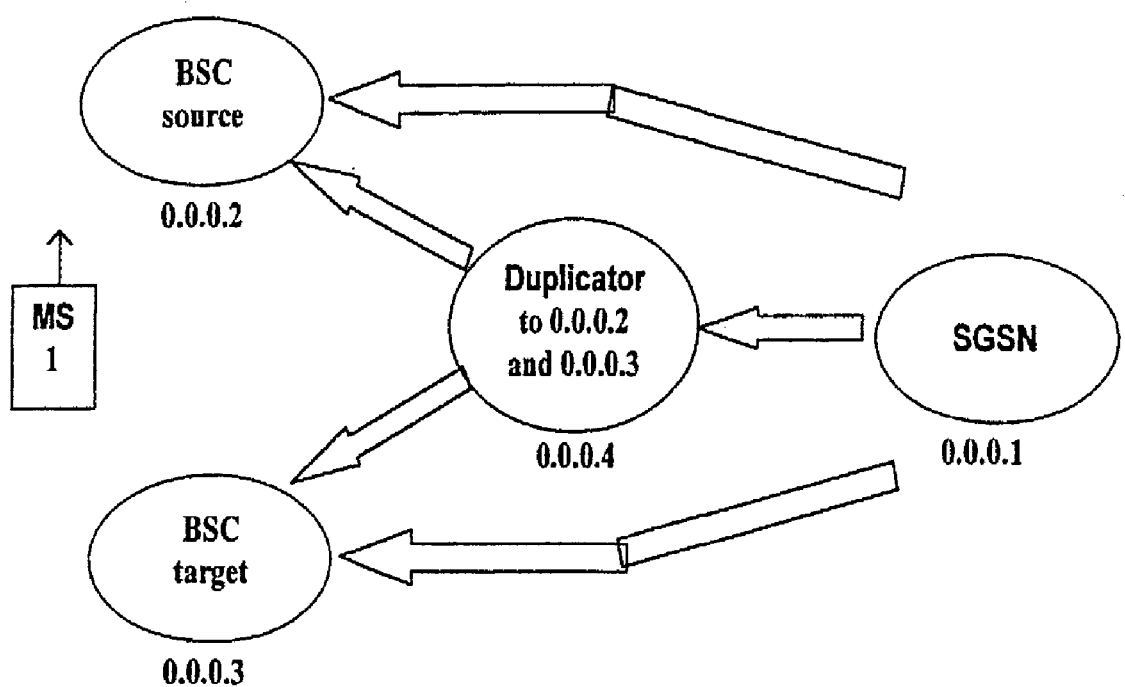
FIG. 4 shows an illustration of the addressing of the duplicated datastream.

FIG. 4 shows the logical functions in the duplication process. In this case, two fundamental options are feasible:

1) A purely IP-based solution, with a specific IP address (in particular the IP address of a duplicator) which is used for addressing by the core network CN or, specifically, by a serving GPRS support node SGSN itself in turn indicating two further IP addresses to which the corresponding IP data packets should be passed. In this context, FIG. 4 first of all shows the data flow from the serving GPRS support node SGSN to the base station controller BSC Source with the IP address 0.0.0.2 during the already described phase 1, then the duplication process which is initiated by the base station controller BSC Source in phase 2 by addressing a duplicator by a corresponding change to the IP addresses of the IP data packets in the serving GPRS support node SGSN to the IP address 0.0.0.4 of the duplicator, with the duplicator now passing the IP data packets both to the base station controller BSC Source with the IP address 0.0.0.2 and to the base station controller BSC Target with the IP address 0.0.0.3. After completion of the duplication process as already described, the IP data packets are now in phase 3 or 4 sent only from the serving GPRS support node SGSN directly to the base station controller BSC Target with the IP address 0.0.0.3.

The advantage of this solution is that it can be set up in a simple manner. No additional processing of the addressing data (headers) in the U-GTP data packets is required. Furthermore, the level of signaling complexity for this solution is very low, since the duplicator need not be configured separately for each transmission channel. However, an adequate number of IP addresses must be provided, since each IP address of a duplicator represents two further IP addresses to which the IP packets should be passed during the duplication process. If not only the two base station controllers from FIG. 4 but a third base station controller are now present, for example with the address 0.0.0.5, and if handovers are intended to be possible between all three base station controllers, then three duplicators are required (duplication on the basis of 0.0.0.2 and 0.0.0.3, on the basis of 0.0.0.2 and 0.0.0.5, and on the basis of 0.0.0.3 and 0.0.0.5) and, in a corresponding manner, three IP addresses must be provided for the duplicators. As the number of base station controllers increases, the number of duplicators and of their IP addresses also increases in a corresponding manner.

2) A mixed solution on an IP and U-GTP basis, with the duplication process being carried out at the U-GTP level rather than at the IP level. This is not shown in the figures. In this case, during phase 2, the duplicator knows the U-GTP addresses of the U-GTP data packets and knows the destination to which the respective data packet should be passed. For this purpose, the duplicator receives IP data packets from the serving GPRS support node SGSN, unpacks them, and reads the address data (headers) from the U-GTP data packets. Depending on the address which is stated in the address data (headers) in the U-GTP data packets, the duplicator passes the corresponding U-GTP data packet via the two IP data links to the base station controllers BSC Source and BSC Target either only to one of the base station controllers or to both base station controllers. In principle, a plurality of base station controllers may also be provided here. Only a single IP address is thus required for only a single duplicator which can duplicate the subscriber data to two base station conrollers even when more than two possible base station controllers are present as the destination. However, provision must be made for the duplicator to access the address data in the U-GTP packets and the duplicator must be adapted separately for each U-GTP data stream and whenever phase 2 of a handover is carried out, and the appropriately increased signaling complexity must be ensured for this purpose.

The invention has been described in detail with particular reference to preferred embodiments thereof and examples, but it will be understood that variations and modifications can be effected within the spirit and scope of the invention.

The invention claimed is:

1. A method for performing a handoff in a mobile data transmission system, comprising:
    before the handoff, transmitting data destined for a mobile terminal to a first transmitting/receiving device having a first address;
    before the handoff, passing the data destined for the mobile terminal from the first transmitting/receiving device to the mobile terminal;
    during at least the portion of the handoff, addressing the data destined for the mobile terminal to a duplicator;
    during at least the portion of the handoff, duplicating the data at the duplicator; and
    during at least the portion of the handoff, sending a first copy of the data from the duplicator to the fist transmitting/receiving device and a second copy of the data from the duplicator to a second transmitting/receiving device.

2. The method as claimed in claim 1, wherein at least a portion of the mobile data transmission system passes data on the basis of an Internet Protocol.

3. The method as claimed in claim 2, wherein
    the first transmitting/receiving device has a first data memory to store data destined for, and data received from, the mobile terminal,
    the second transmitting/receiving device has a second data memory to store data destined for, and data received from, the mobile terminal, and
    during duplication, data is copied from the first data memory to the second data memory.

4. The method as claimed in claim 3, further comprising:
    receiving data transmitted by the mobile terminal at both the first and second transmitting/receiving devices; and
    combining data such that identical data is not propagated through the mobile data transmission system.

5. The method as claimed in claim 4, wherein once the handoff has been carried out successfully, duplication of the data is ended.

6. The method as claimed in claim 5, further comprising optimizing a data route within the data transmission system after duplication of the data has ended.

7. The method as claimed in claim 1, wherein
    the first transmitting/receiving device has a first data memory to store data destined for, and data received from, the mobile terminal,
    the second transmitting/receiving device has a second data memory to store data destined for, and data received from, the mobile terminal, and
    during duplication, data is copied from the first data memory to the second data memory.

8. The method as claimed in claim 7, wherein duplication of the data is initiated by the first transmitting/receiving device.

9. The method as claimed in claim 1, further comprising:
    receiving data transmitted by the mobile terminal at both the first and second transmitting/receiving devices; and
    combining data such that identical data is not propagated through the mobile data transmission system.

10. The method as claimed in claim 1, wherein once the handoff has been carried out successfully, duplication of the data is ended.

11. The method as claimed in claim 10, further comprising optimizing a data route within the data transmission system after duplication of the data has ended.

12. The method as claimed in claim 1, wherein duplication of the data is initiated by the first transmitting/receiving device.

13. The method as claimed in claim 1, wherein
    the first transmitting/receiving device is associated with a first base station controller,
    the second transmitting/receiving device is associated with a second base station controller, and
    the duplicator is provided at the first base station controller.

14. A mobile data transmission system for communicating with a mobile terminal, comprising:
    a transmission unit to transmit data destined for the mobile terminal to a first address before a handoff and to a second address after the handoff;
    a first device having the first address to receive data destined for the mobile terminal and pass the data to the mobile terminal;
    a second device to pass on data to the mobile terminal; and
    a duplicator having the second address to receive data destined for the mobile terminal during at least a portion of the handoff, and to duplicate the data such that a first copy of the data is sent to the first device and a second copy of the data is sent to the second device.

15. The system as claimed in claim 14, wherein the data transmission system is a mobile radio system.

16. The system as claimed in claim 15, wherein the mobile radio system has devices for radio transmission in accordance with a second-generation mobile radio system standard, and has landline network devices in accordance with a third-generation mobile radio system standard.

* * * * *